United States Patent
Doerr et al.

(10) Patent No.: US 6,972,842 B2
(45) Date of Patent: Dec. 6, 2005

(54) MONITORING ALIGNMENT BETWEEN PULSE CARVERS AND PHASE MODULATORS IN OPTICAL SYSTEMS

(75) Inventors: Christopher R. Doerr, Middletown, NJ (US); Hoon Kim, Kyunggi-do (KR)

(73) Assignee: Lucent Technologies Inc., Murray Hill, NJ (US)

(*) Notice: Subject to any disclaimer, the term of this patent is extended or adjusted under 35 U.S.C. 154(b) by 262 days.

(21) Appl. No.: 10/647,662

(22) Filed: Aug. 25, 2003

(65) Prior Publication Data

US 2005/0046843 A1    Mar. 3, 2005

(51) Int. Cl.[7] .............................................. G01J 4/00
(52) U.S. Cl. ...................... 356/364; 356/365; 398/184; 398/186
(58) Field of Search ................................ 356/364, 365, 356/399; 359/237–239, 246, 260, 264, 276, 359/279; 398/182–184, 186, 188–193, 195, 398/197, 200, 201

(56) References Cited

U.S. PATENT DOCUMENTS

| | | | |
|---|---|---|---|
| 5,850,305 A | * | 12/1998 | Pidgeon ........................ 398/193 |
| 6,201,632 B1 | * | 3/2001 | Rollins ........................ 359/259 |
| 6,452,714 B1 | * | 9/2002 | Rollins ........................ 359/325 |
| 2005/0002675 A1 | * | 1/2005 | Sardesai et al. ............ 398/183 |

* cited by examiner

Primary Examiner—Gregory J. Toatley, Jr.
Assistant Examiner—Roy M. Punnoose

(57) ABSTRACT

Timing alignment between a pulse carver (i.e., intensity modulator) and a phase modulator, e.g., in a return-to-zero (RZ) differential phase-shift keying (DPSK) optical transmitter, is monitored by filtering a signal from the transmitter and measuring the power of the filtered signal. In certain embodiments, the filter has a birefringent device (such as a polarization-maintaining fiber) and a polarizer. The polarizer may be a rotating polarizer with a rotating quarter-wave plate in front of it. In other embodiments, the filter is a periodic filter such as a Mach-Zehnder interferometer or an etalon filter. Regardless, the measured power may be used to generate control signals used to variably delay the signals that drive the phase modulator and/or the pulse carver to compensate for detected misalignment. The measured power may also be used to monitor the bit-error-rate degradation caused by timing misalignment between the pulse carver and the phase modulator.

31 Claims, 2 Drawing Sheets

MONITORING ALIGNMENT BETWEEN PULSE CARVERS AND PHASE MODULATORS IN OPTICAL SYSTEMS

BACKGROUND OF THE INVENTION

1. Field of the Invention

This invention relates generally to the field of optical telecommunications and, in particular, to monitoring the alignment between phase- and amplitude-modulating elements of a phase-and-amplitude modulating optical transmitter.

2. Description of the Related Art

Historically, amplitude modulation, in the form of on-off keying (OOK) and return-to-zero OOK (RZ-OOK), has been the predominant form of modulation in optical communication systems. Recently, return-to-zero, differential phase-shift keying (RZ-DPSK) modulation has been proposed as an alternative to on-off keying in optical transmission systems. This is because, compared with OOK systems, RZ-DPSK systems generally offer enhanced receiver sensitivity and also generally reduce the deleterious effects of fiber nonlinearities (e.g., inter- and intra-channel cross-phase modulation). More information can be found in Atia, W. A., and Bondurant, R. S., "Demonstration of return-to-zero signaling in both OOK and DPSK formats to improve receiver sensitivity in an optically preamplified receiver," IEEE Lasers and Electro-Optics Society 12th Annual Meeting, 1999, incorporated herein by reference in its entirety.

In a typical RZ-DPSK modulator configuration, a light source (e.g., laser) is fed to an external (i.e., external to the light source) DPSK phase modulator (e.g., a Mach-Zehnder device) that is fed with a non-return-to-zero (NRZ) representation of the modulating bit stream. The output of the DPSK modulator is then fed to a pulse carver that modulates the intensity of the signal with a temporal pulse train (i.e., the return-to-zero modulation). The pulse carver is typically implemented using an intensity modulator (e.g., a Mach-Zehnder device or an electro-absorption modulator (EAM)) fed with a pulse train or a sinusoidal control signal from a clock.

Operationally, in RZ-DPSK systems, it is desirable to arrange for each peak of each pulse of the pulse train to line up temporally with the middle of a corresponding bit time slot of the phase-modulating NRZ bitstream. However, since the time delay of optical and electrical devices can drift over time due to temperature changes or device aging, it is useful to monitor the alignment status between the pulse carver and the phase modulator during the operation of the system.

In the case of RZ-OOK systems, alignment monitoring can be achieved by monitoring the optical power of the signal at the output of the pulse carver or by detecting the microwave power spectrum of the signal. However, since a phase-modulated data signal provides constant optical power, these techniques cannot be applied for RZ-DPSK systems.

SUMMARY OF THE INVENTION

Problems in the prior art are addressed in accordance with principles of the present invention by monitoring the timing alignment between a pulse carver (i.e., an intensity modulator) and a phase modulator of an optical transmitter, e.g., in a return-to-zero (RZ) differential phase-shift keying (DPSK) system. According to certain embodiments of the present invention, an optical signal from the transmitter is filtered, the power of the filtered signal is measured, and the misalignment between the pulse carver and the data phase modulator is determined based on the measured power. Depending on the implementation, the NRZ signal used to drive the phase modulator or the clock signal used to drive the pulse carver or both can be selectively and variably delayed to compensate for the determined misalignment.

In one embodiment, the optical signal is filtered using a combination of a polarization-maintaining fiber (PMF) followed by a polarizer. In alternative embodiments, the optical signal may be filtered using a periodic filter such as a Mach-Zehnder interferometer or an etalon filter instead of the PMF/polarizer combination. The measured power of the filtered signal can also be used to indicate the bit-error-rate degradation caused by timing misalignment between the pulse carver and the phase modulator.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
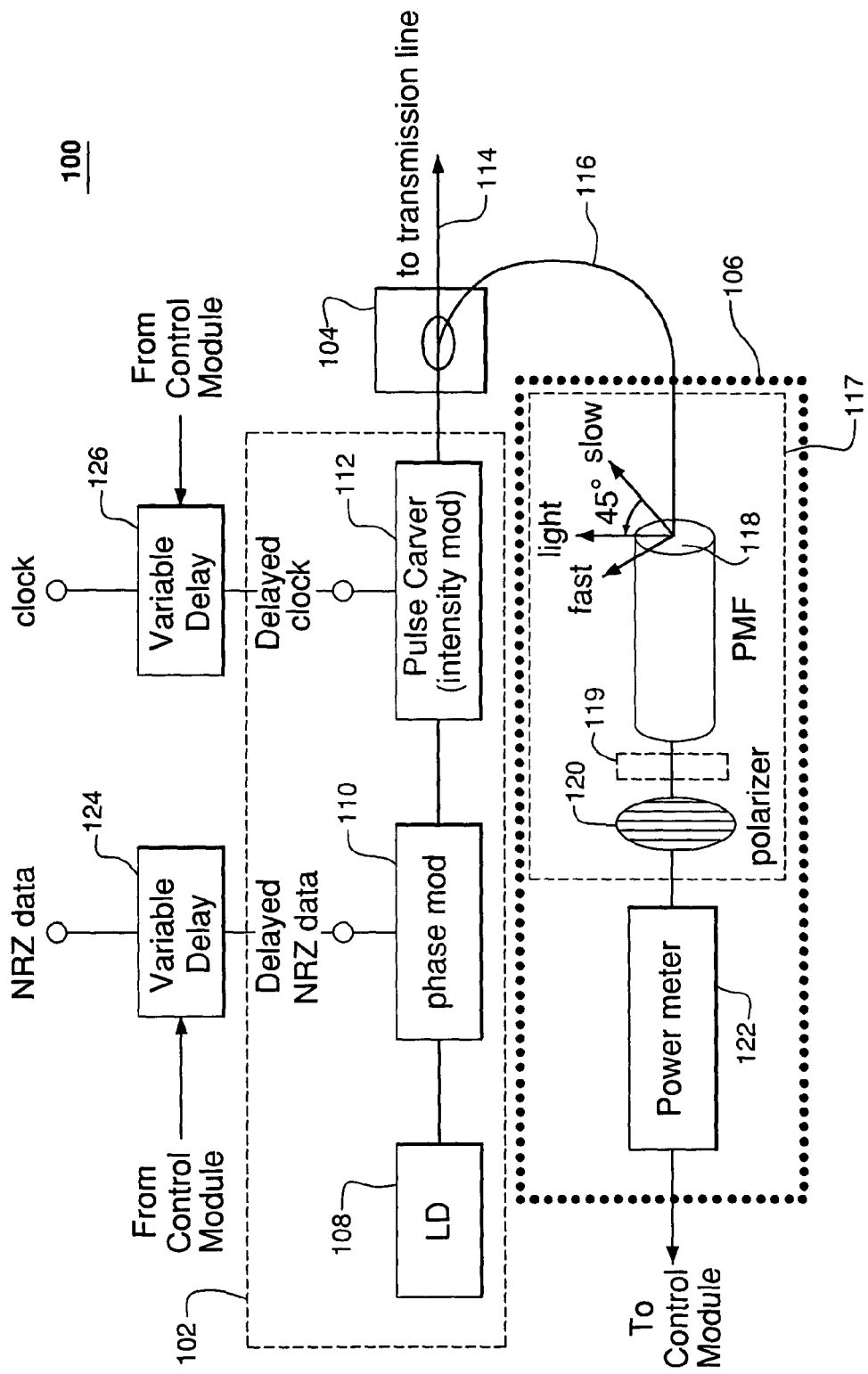
FIG. 1 depicts an optical sub-system according to one embodiment of the present invention.

FIG. 1 depicts an optical sub-system 100 according to one embodiment of the present invention. Optical sub-system 100 includes RZ-DPSK transmitter 102, splitter 104, and alignment-monitoring module (AMM) 106. As shown, the optical output of RZ-DPSK transmitter 102 feeds splitter 104, which splits the transmitter output signal into two paths. One path (114) feeds the transmission line (e.g., an optical fiber that feeds a wavelength division multiplexer), and the other path (116) feeds AMM 106.

RZ-DPSK transmitter 102 includes light-emitting device (e.g., continuous wave laser) 108, phase modulator 110, and pulse carver 112.

Operationally, light-emitting device 108 emits a substantially constant power light signal to phase modulator 110. Phase modulator (e.g., Mach-Zehnder modulator) 110 receives NRZ data from a local client that has been precoded into signals used to control the phase of the light signal that the phase modulator receives from the light-emitting device. A logical '1' in the NRZ data stream is encoded onto a $\pi$ phase change in the light signal, whereas a logical '0' is represented by the absence of a phase change.

The output of the phase modulator is then fed to the pulse carver. The pulse carver converts the incoming NRZ-encoded signals into RZ format signals with a duty cycle that depends on the intensity modulator type and drive condition. For example, when the pulse carver is implemented using a Mach-Zehnder intensity modulator, the pulse carver can generate 33% or 67% duty-cycle RZ signals when it is driven by a sinusoidal signal with a voltage swing of $2 \cdot V_\pi$ at the NRZ data rate. To get 33% duty-cycle RZ signals, the Mach-Zehnder pulse carver is typically biased near its maximum transmission setting and driven with a voltage swing of $2 \cdot V_\pi$. When the pulse carver is biased at its minimum transmission point (i.e., null point) with a voltage swing of $2 \cdot V_\pi$, 67% duty-cycle RZ signals result. The latter signals are also dubbed "carrier-suppressed" RZ signals.

The output of the pulse carver is next fed to splitter 104, where it is preferably split asymmetrically into primary path 114 and monitor path 116. Primary path 114, which receives the bulk (e.g., 90%) of the signal from the pulse carver, serves as the effective output path of the transmitter and may drive an optical transmission path directly or be used as part of a transmit signal, e.g., in an optical add/drop mux (OADM) application. Monitor path 116, which receives a small fraction (e.g., 10%) of the pulse carver output signal, feeds alignment-monitoring module 106.

AMM 106 includes filter 117 (which in FIG. 1 is implemented using polarization-maintaining fiber (PMF) 118 and polarizer 120) and power meter 122. Operationally, PMF 118 receives a sample of the output signal from transmitter 102 via monitor path 116 and introduces a differential group delay (DGD) (e.g., 8 ps) into the signal in order to induce a variation of the state-of-polarization (SOP) at the rising/falling edges of the incoming phase-modulated signal. Polarizer 120 and power meter 122 are then used to measure the degree of polarization (DOP) of the differentially group-delayed signal.

Fundamentally, a PMF works by inducing a difference in the speed of propagation of light for two perpendicular polarizations traveling through the fiber. This birefringence creates two principal transmission axes within the fiber, known respectively as the fast and slow axes of the fiber. Light that is principally aligned with the slow axis of the PMF will be delayed with respect to light that is principally aligned with the fast axis of the PMF. If polarized light is launched on only one of the axes, then the polarization will stay linearly polarized on that axis, even in the face of perturbations such as bending of the fiber. If, however, both axes of the fiber are excited, then the coupled light at the output will generally have a state of polarization that is (a) different from the polarization of the input light and (b) dependent on the phase difference between the two orthogonally polarized beams in the PMF, at the point of recombination at the output of the PMF. These special characteristics of the PMF are exploited in this embodiment of the present invention. Although a PMF is used in the exemplary embodiment of this invention illustrated by FIG. 1, other birefringent optical devices could be used in place of PMF 118 as would be understood to one skilled in the art.

Figure 2A:
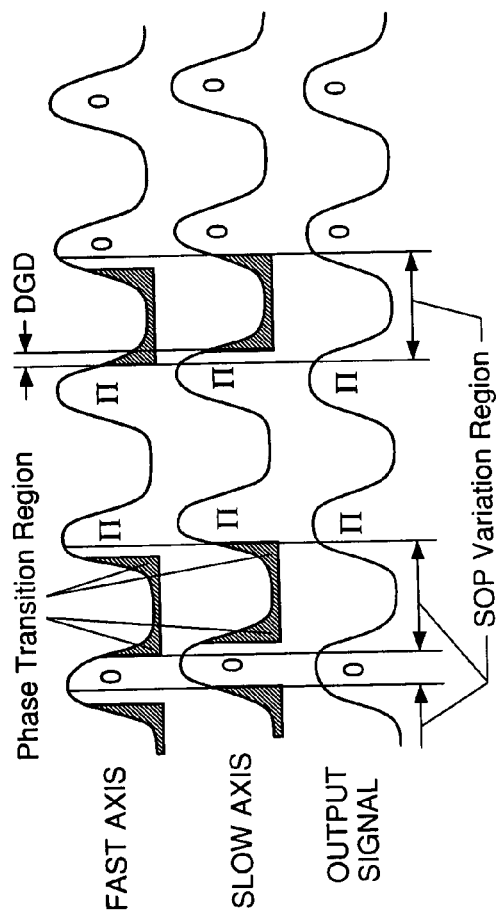
FIG. 2 illustrates the optical waveforms at the output of the polarization-maintaining fiber of FIG. 1.
Figure 2B:
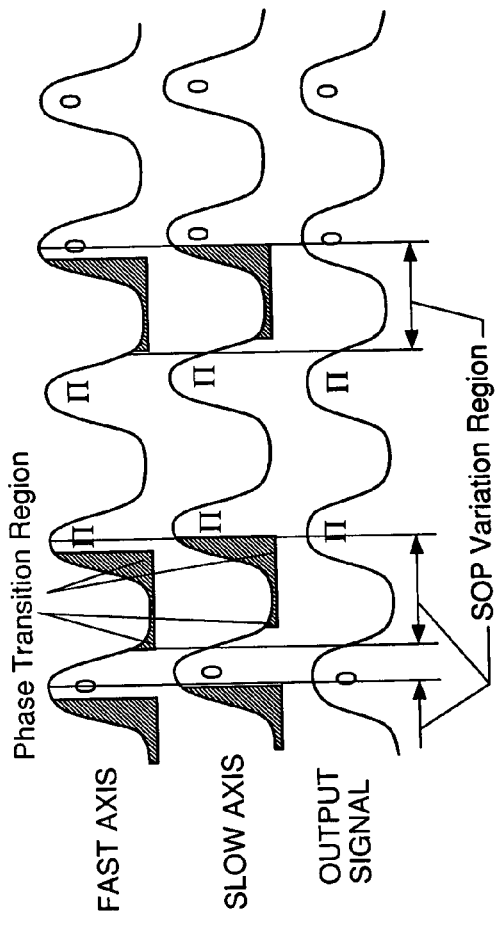

FIG. 2 illustrates the optical waveforms at the output of PMF 118 and is used to help illustrate the principle of operation of AMM 106. Note that, as illustrated in FIG. 1, the polarization axis (i.e., slow axis) of the PMF is adjusted to be rotated roughly 45° with respect to the polarization of the incoming signal from the splitter. Thus, half of the signal moves faster than the other half by the amount of the differential group delay of the PMF, as shown in FIG. 2. The output polarization depends on the optical phase difference between the two orthogonally polarized beams at the point of recombination at the output of the PMF. Therefore, in the presence of the finite DGD, the state of polarization of the PMF output signal at the rising/falling edges of the phase modulation (where the phase is changing) differs from the SOP at the center of the bit (where the phase is effectively stable). This variation of SOP within the bit duration affects the degree of polarization of the output signal, depending upon the alignment status between the pulse carver and phase modulator. For example, when the pulse carver is not well-aligned with the phase modulator as shown in FIG. 2(b), the SOP variation region (i.e., rising/falling edges of the phase modulation) moves toward the maximum transmittance of the RZ pulses, or correspondingly, the region of highest amplitude as is evident by comparing FIG. 2(a) and FIG. 2(b). As discernable from FIG. 2, the integral of the power under the sections of the waveforms corresponding to the SOP variation regions is greater for the waveform of FIG. 2(b) than it is for the waveform of FIG. 2(a). In other words, when the phase modulator and pulse carver are out of alignment (FIG. 2(b)), at the output of the PMF, the power of the signal that is subject to polarization variation is greater than the when the phase modulator and pulse carver are aligned (FIG. 2(a)).

The change in DOP of the PMF output signal is thus a good indication of the misalignment of the phase modulator and the pulse carver and can be detected by using polarizer 120 and power meter 122 as illustrated in FIG. 1. The polarizer, which is placed after the PMF, can be adjusted to either maximize or minimize the optical power detected at the power meter. When the polarization axis of the polarizer is substantially aligned with the nominal SOP of the output of the PMF, transmission through the polarizer is maximized. When the polarization axis of the polarizer is oriented substantially orthogonal to the nominal SOP of the output of the PMF, transmission through the polarizer is minimized.

In one embodiment of the present invention, polarizer 120 of FIG. 1 is substantially aligned orthogonal to the SOP out of the PMF when the phase modulator and the pulse carver are aligned. This alignment is calibrated using bit-error-rate measurements or equivalent mechanisms, as would be understood by one skilled in the art. When orthogonally aligned, power meter 122 will measure a minimum amount of power. However, as misalignment between the phase modulator and the pulse carver occurs, the polarization out of the PMF changes, and more power is passed through the polarizer and registered by the power meter. To improve resolution and sensitivity, the latter orthogonal orientation is preferred; however, in this orientation, the AMM is more susceptible to the interferometric stability of the PMF (than when the polarizer is aligned to maximize the monitoring signal). As such, in other embodiments, an orientation somewhere between orthogonal and coincident is chosen.

Note that FIG. 2 illustrates the variation of the SOP due only to the phase modulation. In the RZ-DPSK format, where both phase and intensity are modulated, the SOP of the signal varies at the rising/falling edges of phase and intensity modulation. However, the variation of the SOP at the rising/falling edges of intensity modulation is not dependent upon the alignment status between the pulse carver and the phase modulator and is thus not germane to this discussion.

Experimental results using the AMM of FIG. 1 show that, over certain ranges of misalignment delay, the curve of the power measured at the output of the A MM vs. the misalignment between the phase modulator and the pulse carver is well-matched to the curve of the power measured vs. bit-error rate (BER) of a transmitter/receiver system. Thus, the AMM can be used as a BER monitor, in the absence of other signal degradations, by measuring the power out of the AMM and applying gain and offset values to the measured power to derive a BER value. For example, in one or more embodiments of the present invention, when the pulse carver and the phase modulator are aligned, the power at the output of the polarizer is minimum. As the timing misalignment increases, however, the power measured begins to increase. This behavior tracks the behavior of the BER vs. power curve, i.e., as power increases, so does BER, and a simple relation can be derived for converting from measured power to BER as would be understood by one skilled in the art.

It should be noted that, for improved monitoring performance, it is beneficial to have interferometric stability in the two principle axes of a length of PMF if polarization fluctuation is to be avoided at the output. In one or more embodiments of the present invention, polarization fluctuation at the output of the PMF may cause measurement error. Utilizing a rotating quarter-wave plate and a rotating polarizer can help minimize this measurement error. In this alternative embodiment of the present invention, filter 117 of FIG. 1 has a rotating quarter-wave plate 119 located after PMF 118 and polarizer 120 is a rotating polarizer. Each time the wave plate rotates once, an arbitrarily polarized signal from the PMF will be changed to a linearly polarized signal four times. Thus, when utilizing a rotating quarter-wave plate followed by a rotating polarizer, the monitoring signal can be obtained by detecting the maximum (or minimum) power of the output signal. It should be noted that the rotating speeds of the wave plate and the polarizer should be different. For example, in a preferred embodiment, the wave plate rotates at the speed of 10 Hz, whereas the polarizer rotates 1 turn per second.

In certain embodiments of the present invention, the phase of either or both of the control signals of the phase modulator and the pulse carver are adjusted by an alignment control module. In the exemplary embodiment of FIG. 1, the control module (not shown) uses the power measurements from power meter 122 to derive control signals that are used to control variable delay units 124 and 126 to control the alignment between phase modulator 110 and intensity modulator 112. In alternative embodiments, one or both of these delay units may be omitted.

As would be understood by one skilled in the art, for the purposes of the present invention, any of a broad class of different RZ-DPSK transmitters may be used in the place of transmitter 102 including transmitters that utilize a pulse carver before the phase modulator and transmitters that incorporate integrated phase and/or pulse carver electronics within the same module as the light-emitting device.

Note that the RZ-DPSK transmitter and AMM of the present invention may be implemented by various techniques and in various technologies while remaining within the spirit and scope of the invention. These techniques and technologies include, but are not limited to, integrated optics (including silica on silicon substrate or Si:SiO$_2$), fiber optics, free space optics, thin film, InGaAs, InP, micromirror microelectro-mechanical system (MEMS) arrays, and optical grating subsystems.

Although the receiver of this invention was described in the context of DPSK-modulated data channels, embodiments of the present invention directed to other phase-modulation schemes (e.g., 8-DPSK and differential quadrature phase-shift-keyed (DQPSK)) would also be within the principle and scope of the present invention, as would be understood by one skilled in the art.

Although a particular class of pulse carver was discussed with reference to the illustrative transmitter of FIG. 1, the principles of the present invention also apply generally to a broad range of alternative RZ intensity modulators available, including mode-locked lasers, and techniques employing the rising and falling edges of the electrical NRZ signal for RZ pulse generation, and including RZ-DPSK, RZ-QPSK, and RZ-FSK modulators, as would be understood by one skilled in the art.

Although the present invention was described with respect to the exemplary implementation of FIG. 1, various alternative implementations are possible as would be understood to one skilled in the art. In particular, in one alternative implementation, PMF 118 can be replaced with another type of birefringent optical device (e.g., a birefringent crystal) while remaining within the scope and intent of the present invention.

Similarly, in another alternative implementation, the combination of PMF 118 and polarizer 120 may be replaced with a periodic filter (e.g., an etalon filter or a Mach-Zehnder interferometer) as would be understood by one skilled in the art. This is because a birefringent element followed by a polarizer is analogous, for example, to a Mach-Zehnder interferometer. Like a Mach-Zehnder interferometer, when the signal enters the birefringent element, it is split into two signals, each signal traveling a different path length. Then, again like a Mach-Zehnder interferometer, the two signals interfere with each other (at the polarizer in the birefringent element case or at the second coupler in the Mach-Zehnder interferometer case). Likewise, a reflection-type filter, such as an etalon, provides a similar type of filtering. Advantages of other types of filters over birefringent device-based arrangements are that the other filters can be made to not depend on the polarization of the monitor signal, and they can often be made in such a way that their operation is more stable with respect to temperature variations and aging. In these alternative embodiments, filter 117 of FIG. 1 would represent a periodic filter such as a Mach-Zehnder interferometer or an etalon filter rather than the PMF/polarizer combination.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

What is claimed is:

1. A method for monitoring alignment between a phase modulator and a pulse carver of an optical transmitter, the method comprising:
   filtering at least a portion of an optical output signal from the transmitter to generate a filtered optical signal;
   measuring power of the filtered optical signal; and
   determining misalignment between the phase modulator and the pulse carver based on the measured power of the filtered optical signal.

2. The invention of claim 1, wherein the filtering comprises:
   processing the portion of the optical output signal to produce a differentially group delayed (DGD) optical signal; and
   processing the DGD optical signal to produce a polarized optical signal.

3. The invention of claim 2, wherein the DGD optical signal is produced by passing the portion of the optical output signal through a birefringent device.

4. The invention of claim 3, wherein the birefringent device is a polarization-maintaining fiber.

5. The invention of claim 3, wherein a slow axis of the birefringent device is oriented substantially 45 degrees from the state of polarization (SOP) of the portion of the optical output signal.

6. The invention of claim 2, wherein the polarized optical signal is generated bypassing the DGD optical signal through a polarizer.

7. The invention of claim 6, wherein the polarization axis of the polarizer is oriented substantially orthogonal to the SOP of the DGD optical signal.

8. The invention of claim 2, wherein the polarized optical signal is generated by passing the DGD optical signal through a rotating wave plate followed by a rotating polarizer.

9. The invention of claim 1, wherein the filtering comprises passing the portion of the optical output signal through a periodic filter.

10. The invention of claim 9, wherein the periodic filter is a Mach-Zehnder interferometer.

11. The invention of claim 9, wherein the periodic filter is an etalon filter.

12. The invention of claim 1, further comprising adjusting the phase of at least one of the phase modulator and the pulse carver based on the measured power.

13. The invention of claim 12, wherein the phases of both the phase modulator and the pulse carver are adjusted based on the measured power.

14. The invention of claim 12, wherein the phase is adjusted until the measured power is maximized.

15. The invention of claim 1, wherein the optical output signal is a return-to-zero, phase-modulated optical signal.

16. A module for monitoring alignment between a phase modulator and a pulse carver of an optical transmitter, the module comprising:
 a filter adapted to receive at least a portion of an optical output signal from the transmitter and generate a filtered optical signal; and
 a power meter connected to measure power of the filtered optical signal and adapted to provide the measured power to a processor capable of determining misalignment between the phase modulator and the pulse carver based on the measured power of the filtered optical signal.

17. The invention of claim 16, wherein the filter comprises:
 a birefringent device adapted to process the portion of the optical output signal to produce a differentially group delayed (DGD) optical signal; and
 a polarizer adapted to process the DGD optical signal to produce a polarized optical signal.

18. The invention of claim 17, wherein the birefringent device is a polarization-maintaining fiber.

19. The invention of claim 17, wherein a slow axis of the birefringent device is oriented substantially 45 degrees from the state of polarization (SOP) of the portion of the optical output signal.

20. The invention of claim 17, wherein the polarization axis of the polarizer is oriented substantially orthogonal to the SOP of the DGD optical signal.

21. The invention of claim 17, wherein:
 the filter further comprises a rotating wave plate positioned between the birefringent device and the polarizer; and
 the polarizer is a rotating polarizer.

22. The invention of claim 16, wherein the filter is a periodic filter.

23. The invention of claim 22, wherein the periodic filter is a Mach-Zehnder interferometer.

24. The invention of claim 22, wherein the periodic filter is an etalon filter.

25. The invention of claim 16, further comprising one or more variable delay devices adapted to adjust the phase of at least one of the phase modulator and the pulse carver based on the measured power.

26. The invention of claim 25, wherein the one or more variable delay devices are adapted to adjust the phases of both the phase modulator and the pulse carver based on the measured power.

27. The invention of claim 25, wherein the one or more variable delay devices are adapted to adjust the phase until the measured power is maximized.

28. The invention of claim 16, wherein the optical output signal is a return-to-zero, phase-modulated optical signal.

29. The invention of claim 16, wherein the module comprises the processor.

30. An optical sub-system comprising:
 an optical transmitter having a phase modulator and a pulse carver; and
 a module adapted to monitor alignment between the phase modulator and the pulse carver, wherein the module comprises:
  a filter adapted to receive at least a portion of an optical output signal from the transmitter and generate a filtered optical signal; and
  a power meter connected to measure power of the filtered optical signal and adapted to provide the measured power to a processor capable of determining misalignment between the phase modulator and the pulse carver based on the measured power of the filtered optical signal.

31. The invention of claim 30, wherein the sub-system comprises the processor.

* * * * *